(12) United States Patent
Kolditz

(10) Patent No.: US 9,296,135 B2
(45) Date of Patent: Mar. 29, 2016

(54) ANTISTATIC COMPOSITIONS COMPRISING A THERMOPLASTIC POLYESTER AND A MIXTURE OF ANTISTATIC ADDITIVES

(75) Inventor: Pirko Kolditz, Hamburg (DE)

(73) Assignee: CLARIANT INTERNATIONAL LTD., Muttenz (CH)

( * ) Notice: Subject to any disclaimer, the term of this patent is extended or adjusted under 35 U.S.C. 154(b) by 195 days.

(21) Appl. No.: 14/115,775

(22) PCT Filed: Apr. 5, 2012

(86) PCT No.: PCT/EP2012/001607
§ 371 (c)(1),
(2), (4) Date: Nov. 5, 2013

(87) PCT Pub. No.: WO2012/163448
PCT Pub. Date: Dec. 6, 2012

(65) Prior Publication Data
US 2014/0076902 A1    Mar. 20, 2014

(30) Foreign Application Priority Data

May 28, 2011 (EP) .................................. 11004393

(51) Int. Cl.

| | | |
|---|---|---|
| *C08G 63/02* | (2006.01) | |
| *B29C 45/00* | (2006.01) | |
| *C08J 3/22* | (2006.01) | |
| *C08J 5/18* | (2006.01) | |
| *C08K 5/00* | (2006.01) | |
| *C08L 67/02* | (2006.01) | |
| *B65D 1/40* | (2006.01) | |
| *C08G 69/00* | (2006.01) | |
| *C08K 5/103* | (2006.01) | |
| *C08K 5/42* | (2006.01) | |
| *C08L 71/02* | (2006.01) | |

(52) U.S. Cl.
CPC . *B29C 45/00* (2013.01); *B65D 1/40* (2013.01); *C08J 3/226* (2013.01); *C08J 5/18* (2013.01); *C08K 5/0075* (2013.01); *C08L 67/02* (2013.01); *B65D 2213/02* (2013.01); *C08J 2367/02* (2013.01); *C08J 2467/00* (2013.01); *C08K 5/103* (2013.01); *C08K 5/42* (2013.01); *C08L 71/02* (2013.01)

(58) Field of Classification Search
CPC .............................. C08G 63/78; C08G 63/183
USPC .................................................. 528/271, 272
See application file for complete search history.

(56) References Cited

U.S. PATENT DOCUMENTS

| 5,288,781 A | 2/1994 | Song et al. |
| 2004/0024141 A1 | 2/2004 | Hasebe et al. |
| 2006/0041056 A1* | 2/2006 | Sunagawa et al. ............. 525/7.4 |
| 2010/0105836 A1 | 4/2010 | Mawatari |

FOREIGN PATENT DOCUMENTS

| CN | 101516995 | 8/2009 |
| JP | 54 045380 | 4/1979 |
| JP | 2000034471 | 2/2000 |

OTHER PUBLICATIONS

PCT International Search Report for PCT/EP2012/001607, mailed May 25, 2012.
English Translation of Taiwan Office Action, dated Jul. 29, 2015.
Taiwan IPO Search Report, dated Jun. 12, 2015.
English Translation of Taiwan IPO Search Report, dated Jun. 12, 2015.
English Translation of JP 54 045380.
English Abstract of JP 2000034471.

* cited by examiner

Primary Examiner — Terressa Boykin
(74) Attorney, Agent, or Firm — Anthony A. Bisulca

(57) ABSTRACT

The invention relates to compositions comprising certain thermoplastic polyesters, and antistatic additives, the compositions being in the form of masterbatches, or compounds, and their use for producing antistatic polyester single and multilayer films sheets boards and articles made of antistatic compounds.

15 Claims, No Drawings

ANTISTATIC COMPOSITIONS COMPRISING A THERMOPLASTIC POLYESTER AND A MIXTURE OF ANTISTATIC ADDITIVES

The invention relates to compositions comprising a certain thermoplastic polyester and antistatic additives, the compositions being in the form of masterbatches or Compounds, and their use for producing antistatic polyester single and multi-layer films, sheets, boards and articles made of antistatic Compounds.

In the plastics industry it is customary to use additives in the form of Compounds or masterbatches.

For the purposes of the invention, masterbatches are compositions comprising a carrier polymer and the additive, in which the additive is present in the masterbatch in higher concentrations than in the final application and the carrier polymer is often not the polymer of the final application. Preferred concentrations of the additives in a masterbatch range of from 0.1 to 90% by weight, in particular of from 1 to 80% by weight, especially of from 10 to 75% by weight, based on the total weight of the masterbatch.

For the purposes of the invention, Compounds are compositions comprising a polymer and the additive, in which the additive is present in the Compound in the desired final concentration of the final application or final article and the polymer is the desired polymer of the final application or final article, so that the Compound is merely brought to the desired shape of the final application or final article by means of a physical shaping process.

Masterbatches and/or Compounds which contain antistatic additives and are used for producing antistatic compounds have to satisfy demanding requirements: the compositions should have a high loading, i.e. a high concentration of the antistatic additives, and it should be possible to set the desired surface resistance in the final article. Further requirements are good miscibility and compatibility with the polymer of the final application or the final article, also good transparency of the final product is very important. Additionally, very small adverse effects on the mechanical and thermal properties of the final article, in particular in respect of impact strength, tensile strength or heat distortion resistance, are demanded.

Antistatic Masterbatches and Compounds of the present invention are used to produce packaging which displays little if any electrostatic charging combined with a very good transparency and is used, for example, in the packaging of electronic components. Other application fields are body parts used in the automobile industry that are well-suited for painting by means of an electrostatic paint deposition process.

US 2007/0203282 A1 discloses electrostatic compositions based on a polyamide matrix comprising both electrically conductive fillers and antistatic agents.

U.S. Pat. No. 4,696,950 discloses substantially static-free, cellular expanded or foamed thermoplastic articles.

EP 1544233 A1 discloses a polyolefin packaging film having improved antifog and antiblocking properties.

US 2006/186010 A1 discloses a medical device packaging and antistatic system.

The known compositions do not satisfy all present-day requirements of industry, as have been mentioned above. There is a need for masterbatches and Compounds containing antistatic additives which have the required low haze level and loading of additives by means of which the required surface resistance and charge decay time of the polymer can be set.

It was found that a composition Z comprising a polyester and a special mixture of antistatic additives surprisingly displays improved properties.

Subject of the invention is a composition Z comprising a component A, a component B, a component C and a component P, wherein
the component A is an alkyl sulfonate, alkylbenzene sulfonate and/or olefin sulfonate,
the component B comprises a fatty acid monoglyceride,
the component C is a polyethylene glycol,
and the component P is a thermoplastic polyester.

The composition Z is preferably a masterbatch MB or an antistatic Compound AC as defined before.

For the purposes of the invention, an antistatic Compound is characterized by an electrical surface resistance of from $10^6$ ohm to $10^{13}$ ohm, preferably of from $10^8$ ohm to $5*10^{12}$ ohm, in particular of from $10^9$ ohm to $10^{12}$ ohm and preferably a charge decay time of 0.1 to 200 s, more preferably of 1 to 170 s, in particular of 2 to 150 s, even more preferred of 10 to 120 s, measured on a cast-extruded film or finished product produced from the antistatic Compound AC at 23° C. and 30% RH (relative humidity). In addition, for the purpose of the invention a cast-extruded film with a thickness of 200 μm is characterized by a haze value of below 10%, preferably of below 7%, in particular of below 4.5%.

Preferably, component A comprises 1, 2, 3, or 4, more preferably 1 or 2, even more preferably 1, alkyl sulfonates, alkylbenzene sulfonates or olefin sulfonates. It is preferred that component A is selected from the group of alkyl sulfonates. Preferred alkyl sulfonates are ammonium or alkali metal alkyl sulfonates, more preferably alkali metal $C_6$-$C_{22}$-alkyl sulfonates, especially alkali metal $C_{10}$-$C_{18}$-alkyl sulfonates, most preferred $C_{12}$-$C_{18}$-alkyl sulfonates. Alkali metals are preferably lithium, sodium or potassium, most preferred sodium. Ammonium is $NH_4^+$ or a mono-, di-, tri- or tetraalkylated ammonium, wherein the alkyl groups are preferably $C_1$-$C_4$-alkyl groups which are optionally substituted with hydroxyl. The alkyl groups can be linear or branched, e.g. linear or secondary alkyl sulfonates.

Examples of alkyl sulfonates are sodium hexyl sulfonate, sodium octylsulfonate, sodium decylsulfonate, sodium dodecylsulfonate, sodium tetradecylsulfonate, sodium hexadecylsulfonate, sodium octadecylsulfonate, sodium eicosylsulfonate, sodium docosylsulfonate, lithium tetradecylsulfonate, lithium hexadecylsulfonate, lithium octadecylsulfonate, potassium eicosylsulfonate, and potassium docosylsulfonate.

Preferred alkylbenzene sulfonates are sodium or potassium dodecylbenzene sulfonate.

Preferred olefin sulfonates are alpha-olefin sulfonates, especially having 12 to 18 carbon atoms.

Preferably, component B comprises 1, 2, 3, or 4, more preferably 1 or 2, even more preferably 1, monoglycerides of fatty acids.

Preferred monoglycerides of fatty acids have a fatty acid with a chain length of from $C_4$ to $C_{24}$, more preferably of from $C_6$ to $C_{20}$, in particular of from $C_{12}$ to $C_{18}$, especially of from $C_{16}$ to $C_{18}$. Said fatty acids can be saturated or unsaturated. Preferred are saturated and mono-unsaturated fatty acids having a chain length as specified above.

Expediently, commercially available monoglycerides of fatty acids can be used for the purpose of the present invention. Those commercially available products are often mixtures containing more than one monoglyceride and also as by-products free glycerol, free fatty acids, and di- and triglycerides of fatty acids.

The monoglyceride content of component B is preferably of from 30 to 99% by weight, more preferably of from 50 to 98% by weight, in particular of from 70 to 97% by weight, based on the total weight of component B.

Preferably the acid number of component B is of below 5%, more preferably of below 3%, even more preferably of below 1%.

Preferably the free glycerol content of component B is of below 5%, more preferably of below 3%, even more preferably of below 1%.

Preferably the iodine value of component B is of below 5%, more preferably the below 3%, even more preferably below 2%, in particular below 1%.

Preferably, component C comprises 1, 2, 3, or 4, more preferably 1 or 2, even more preferably 1, polyethylene glycols.

Preferred polyethylene glycols are polyethylene glycols with a molar mass distribution $M_n$, of from 100 g/mol to 8,000,000 g/mol, preferably of from 150 g/mol to 1,000,000 g/mol, more preferably of from 160 g/mol to 100,000 g/mol, especially of from 180 g/mol to 35,000 g/mol, more especially of from 200 g/mol to 20,000 g/mol.

Preferred polyethylene glycols are polyethylene glycols with a pH Value of from 3.0 to 12, preferably of from 3.5 to 9.0 more preferably of from 5.0 to 7.0. Preferred polyethylene glycols are polyethylene glycols with a viscosity at 20° C. (50% in aqueous solution) of from 50 to 14,000 mPa*s, polyethylene glycols with a viscosity at 20° C. (1% in aqueous solution) of from 4000 to 15,000 mPa*s, polyethylene glycols with a viscosity at 20° C. (2% in aqueous solution) of from 400 to 800 mPa*s and polyethylene glycols with a viscosity at 20° C. (5% in aqueous solution) of from 30 to 50 mPa*s.

Preferred polyethylene glycols are polyethylene glycols with a hydroxyl value of from 0.1 to 800 mg KOH/g, more preferably of from 3 to 700 mg KOH/g, even more preferably of from 5 to 600 mg KOH/g, especially of from 4 to 595 mg KOH/g, especially of from 34 to 592 mg KOH/g, more especially of from 530 to 591 mg KOH/g.

Preferred polyethylene glycols are linear polyethylene glycols with two free hydroxyl end groups.

Preferably, component P comprises 1, 2, 3, or 4, more preferably 1 or 2, even more preferably 1, thermoplastic polyesters.

Examples for the diol component of suitable thermoplastic polyesters are ethylene glycol, diethylene glycol, butane-1,4-diol, cyclohexylene-1,4-diol, 1,4-cyclohexylenedimethanol, 2,2,4,4-tetramethylcyclobutane-1,3-diol.

Examples for the dicarboxylic acid component of suitable thermoplastic polyesters are terephthalic acid, dimethylterephthalic acid, phthalic acid, isophthalic acid, naphthalene-2,6-dicarboxylic acid.

Thermoplastic polyesters can be homopolymers or copolymers.

Examples for homopolymers are polybutylene terephthalate (PBT), polyethylene terephthalate (PET), polyethylene 2,6 naphthalate (PEN), poly trimethylene terephthalate (PTT), poly (1,4-cyclohexylendimethyl terephthalate) (PCT). Polyester copolymers of the present invention are so-called modified polyesters and contain two or more different diol components and one dicarboxylic acid component, or contain two or more different dicarboxylic acid components and one diol component, or contain two or more different dicarboxylic acid components and two or more diol components.

In a preferred embodiment the thermoplastic polyesters are copolymers selected from the group of diethylenglycol or cyclohexan-1,4-dimethanol modified polyethylene terephthalate (PETG),
from the group of isophthalic acid-modified polyethylene terephthalate,
from the group of thermoplastic polyesters made from dimethyl terephthalate, 1,4-cyclohexane-1,4-dimethanol and 2,2,4,4-tetramethylcyclobutane-1,3-diol.

Especially the thermoplastic polyesters are selected from the group of diethylenglycol or cyclohexane-1,4-dimethanol-modified polyethylene terephthalate (PETG) with a diethylenglycol or cyclohexane-1,4-dimethanol content of from 0.1 to 40%, preferably 0.2 to 20%, in particular 0.5 to 10%, by weight based on the total weight of the polyester; from the group of isophthalic acid-modified polyethylene terephthalate with a isophthalic acid content of from 0.1 to 40%, preferably 0.2 to 20%, in particular 0.5 to 10%, by weight based on the total weight of the polyester;
from the group of thermoplastic polyesters made from dimethyl terephthalate, 1,4-cyclohexane-1,4-dimethanol and 2,2,4,4-tetramethylcyclobutane-1,3-diol with a 2,2,4,4-tetramethylcyclobutane-1,3-diol content of from 0.1 to 40%, preferably 0.2 to 20%, in particular 0.5 to 10%, by weight based on the total weight of the polyester.

Preferred density of component P is of from 1.20 to 1.58 g/cm$^3$, more preferably of from 1.25 to 1.4 g/cm$^3$, even more preferably of from 1.30 to 1.38 g/cm$^3$.

Preferred intrinsic viscosity of component P is of from 0.4 dl/g to 2.0 dl/g, more preferably of from 0.5 to 1.5 dl/g, even more preferably of from 0.6 to 1.0 dl/g.

Preferred acetaldehyde content of component P is equal to or below 3 ppm, more preferably is equal to or below 2 ppm, more preferably is equal to or below 1 ppm.

The composition Z expediently comprises of from 0.05 to 90% by weight of the sum of the components A and B and C, preferably Z comprises of from 0.10 to 80% by weight of the sum of the components A and B and C, more preferably Z comprises of from 0.15 to 70% by weight of the sum of the components A and B and C, even more preferably Z comprises of from 0.2 to 50% by weight of the sum of the components A and B and C, especially Z comprises of from 0.20 to 25% by weight of the sum of the components A and B and C, with the % by weight being based on the total weight of the composition Z.

The composition Z expediently comprises
0.05 to 30% by weight of component A,
0.01 to 12.5% by weight of component B,
0.05 to 30% by weight of component C,
27.5 to 99.89% by weight of component P,
with the weight % being based on the total weight of composition Z.

If the composition Z is a masterbatch MB, Z expediently comprises
4.1 to 30% by weight of component A,
1 to 12.5% by weight of component B;
5 to 30% by weight of component C;
27.5 to 89.9% by weight of component P;
preferably, the composition Z as a Masterbatch MB comprises
5 to 30% by weight of component A,
1 to 12.5% by weight of component B;
5 to 30% by weight of component C;
27.5 to 89% by weight of component P;
more preferably, the composition Z as a Masterbatch comprises
7.5 to 25% by weight of component A,
1.5 to 10% by weight of component B;
7.5 to 25% by weight of component C;
40 to 83.5% by weight of component P;
even more preferably, the composition Z as a Masterbatch MB comprises
10 to 20% by weight of component A, 2 to 7.5% by weight of component B;
10 to 20% by weight of component C;
52.5 to 78% by weight of component P;
with the % by weight in each case being based on the total weight of the composition Z.

In another embodiment, the composition Z as a Masterbatch MB comprises
12.5 to 17.5% by weight of component A,
2.5 to 5% by weight of component B;
12.5 to 17.5% by weight of component C;
60 to 72.5% by weight of component P;
with the % by weight in each case being based on the total weight of the composition Z.

If the composition Z is an antistatic Compound AC, Z expediently comprises
0.05 to 4.0% by weight of component A,
0.01 to 2.0% by weight of component B;
0.05 to 4.0% by weight of component C;
90.0 to 99.89% by weight of component P;
preferably, the composition Z as an antistatic Compound AC comprises
0.1 to 3.0% by weight of component A,
0.02 to 1.5% by weight of component B;
0.1 to 3.0% by weight of component C;
92.5 to 99.78% by weight of component P;
more preferably, the composition Z as an antistatic Compound AC comprises
0.15 to 2.5% by weight of component A,
0.05 to 1.25% by weight of component B;
0.25 to 2.5% by weight of component C;
93.75 to 99.55% by weight of component P;
even more preferably, the composition Z as an antistatic Compound AC comprises
0.20 to 2.0% by weight of component A,
0.075 to 1.0% by weight of component B;
0.5 to 2.0% by weight of component C;
95.0 to 99.225% by weight of component P;
especially, the composition Z as an antistatic Compound AC comprises
0.25 to 1.75% by weight of component A,
0.1 to 0.75% by weight of component B;
0.75 to 1.75% by weight of component C;
95.75 to 98.9% by weight of component P;
more especially, the composition Z as a antistatic Compounds AC comprises
0.5 to 1.5% by weight of component A,
0.2 to 0.5% by weight of component B;
1.0 to 1.5% by weight of component C;
96.5 to 98.3% by weight of component P;
the % by weight being in each case based on the total weight of the composition Z.

The composition Z can contain further substances, preferably
- colorants, with organic and inorganic dyes and pigments being possible as colorants; as organic pigments, preference is given to using azo or diazo pigments, coated azo or diazo pigments or polycyclic pigments; preferred polycyclic pigments are diketopyrrolopyrrole, phthalocyanine, quinacridone, perylene, dioxazine, anthraquinone, thioindigo, diaryl or quinophthalone pigments; as inorganic pigments, preference is given to using metal oxides, mixed oxides, aluminium sulphates, chromates, metal powders, pearl-effect pigments (mica), luminous pigments, titanium oxides, cadmium-lead pigments, iron oxides, carbon black, silicates, nickel titanates, cobalt pigments or chromium oxides suitable for pigmentation;
- dispersing aids, preferred dispersants are polar acid esters of $C_{10}$-$C_{30}$ alcohols
- fillers such as silica, zeolites, silicates such as aluminium silicates, sodium silicate, calcium silicates, chalk, talc;
- auxiliaries, preferably metal soaps, blowing agents, nucleating agents, peroxides, antioxidants;
- antistatics, e.g. alkylamines, ethoxylated alkylamines, glyceryl esters different from component B, or mixtures (blends) thereof;
- UV absorbers and hindered amine light stabilizer (HALS) compounds, slip agents, antifogging agents, anticondensation agents and/or suspension stabilizers, flame retardants; antioxidants or other customary plastics additives; ionic liquids;
- or mixtures of these.

These further substances are expediently present from 0 to 50%, preferably 0.01 to 20%, more preferably 0.1 to 10%, by weight based on total weight of the composition Z.

The invention further provides a process for producing a composition Z, characterized in that the components A, B, C and P and optionally any further components are physically mixed with one another.

The mixing of the components can occur in one step or in a plurality of steps. As mixing apparatuses for physical mixing, it is possible to use the mixing apparatuses customary in the plastics industry, preferably an apparatus selected from the group consisting of extruders, kneaders, presses, injection-moulding machines and blade mixers. When the composition Z is a masterbatch MB, the mixing apparatuses are preferably extruders, kneaders and/or blade mixers. When the composition Z is a Compound AC, the mixing apparatuses are preferably extruders, presses and injection-moulding machines, particularly preferably extruders.

Mixing preferably occurs continuously or batchwise, particularly preferably continuously, in the case of a masterbatch MB preferably by extrusion or kneading, particularly preferably by extrusion, and in the case of a Compound AC preferably by extrusion or injection moulding or pressing, particularly preferably by extrusion.

Mixing is preferably carried out at a temperature of from 80 to 330° C., more preferably of from 130 to 300° C., even more preferably of from 180 to 295° C., especially of from 200 to 290° C.

The mixing time is preferably of from 5 sec to 10 h.

The mixing time in the case of continuous mixing is preferably of from 5 sec to 1 h, more preferably of from 10 sec to 15 min.

The mixing time in the case of batchwise mixing is preferably of from 1 min to 10 h, more preferably of from 2 min to 8 h, in particular of from 2 min to 5 h, especially of from 2 min to 1 h, particularly preferably of from 2 to 15 min.

In the case of an antistatic Compounds AC, the component A, B, C and P are preferably mixed in the form of a masterbatch MB with a thermoplastic polymer P. Furthermore, a premix of the masterbatch MB with pelletized thermoplastic polyester is preferably used for physical mixing.

The composition Z is preferably used for producing an antistatic polyester, more preferably for producing an antistatic thermoplastic polyester film, board or sheet. The compositions Z, both in the form of a masterbatch MB or in the form of an antistatic compound AC, are surprisingly characterized by a low surface resistance and a low Charge Decay Time combined with a low haze level of the finished product.

The compositions Z are preferably used for the production of or as antistatic Compounds and/or articles made of antistatic Compounds, e.g. for use in articles for explosion protection or in ESD-packaging The compositions Z are preferably used for the production of or as antistatic Compound for packaging which displays little if any electrostatic chargeability, e.g. antistatic packaging Test Methods:

The product properties are determined by the following methods, unless indicated otherwise:

Determination of the molar mass distribution $M_n$ is done by gel permeation chromatography (GPC) according to DIN 55672.

Determination of the viscosity at 20° C. of a 1%, 2%, 5% or 50% aqueous solution in accordance with ISO 6388;

The determination of the intrinsic viscosity is carried out with a Davenport Melt Viscosimeter with the following conditions: predrying of 3.8 g polyester powder at 150° C. with vacuum for 8 to 12 h, Die length 1.269 cm, Die diameter 0.0508 cm, processing temperature 295° C.;

Determination of the density in accordance with ISO 1183 (g/cm$^3$);

Determination of the acid number by ISO 2114 (mgKOH/g);

Determination of the Haze Value of the film samples with a thickness of 200 µm, measured with the Device Spectraflash 600 from Datacolor International in accordance with ASTM D1003 97;

Determination of the iodine value is done according to A.O.C.S. Official Method Cd 1-25;

Determination of the monoglyceride content is done according to A.O.C.S. Official Method Ca 11b-91;

Determination of the free glycerol content is done according to A.O.C.S. Official Method Ca 11b-91;

The determination of the acetaldehyde content is carried out with a gas chromatograph in in accordance with ASTM F2013-01.

The determination of the electrical surface resistance in accordance with DIN EN 61340-2-3, is carried out 4 days after production of the sample after conditioning at 23° C. and 30% relative humidity (RH) for minimum 48 hours. The measurement is carried out with a ring electrode according to Picture 1 of DIN EN61340-2-3 with a spacing of 1 cm and a measurement voltage of 100 V.

The determination of the electric charge decay time in accordance with DIN EN 61340-2-1 is carried out 4 days after production of the sample after conditioning at 23° C. and 30% relative humidity (RH) for minimum 48 hours. The measurement is carried out with the device JCI 155 from John Chubb Instrumentation, with 9 kV corona discharge for 20 ms. The charge decay time is taken after 10% of the Peak voltage is achieved.

EXAMPLES

Substances used:

Component A: sodium $C_{12}$-$C_{18}$-alkyl sulphonate.

Component B: Glycerol monostearate, with a monoglyceride content of above 90%, a iodine value of maximum 2% and a free glycerol content of below 1%.

Component C1: Polyethylene glycol, with a hydroxyl value of below 4 mg KOH/g, and an average molecular weight of 35,000 g/mol, Component C2: Polyethylene glycol, with a hydroxyl value of 10 to 12 mg KOH/g, and an average molecular weight of 10,000 g/mol Component C3: Polyethylene glycol, with a hydroxyl value of from 5 to 7 mg KOH/g, and an average molecular weight of 20,000 g/mol, Component C4: Polyethylene glycol, with a hydroxyl value of below 1 mg KOH/g, and an average molecular weight of 100.000 g/mol Component P1: Isophthalic acid-modified polyethylene terephthalate having an intrinsic viscosity of from 0.78 to 0.82 dl/g and an acetaldehyde content of below 1 ppm.

Component P2: polyethylene terephthalate homopolymer, having an intrinsic viscosity of from 0.86 to 0.92 dl/g.

In the following examples percentages are weight percent based on the total weight of the mixture or the article, unless indicated otherwise; parts are parts by weight; "Comp." means Comparative Example.

Comparative Example 1

10 parts of component A and 90 parts of component P1 are homogenized together on a twin-screw extruder (temperature of the extruder: 240 to 260° C.). A masterbatch MB1 is obtained.

Comparative Example 2

10 parts of component B and 90 parts of component P1 are homogenized together on a twin-screw extruder (temperature of the extruder: 240 to 260° C.). A masterbatch MB2 is obtained.

Comparative Example 3

10 parts of component C1 and 90 parts of component P1 are homogenized together on a twin-screw extruder (temperature of the extruder: 240 to 260° C.). A masterbatch MB3 is obtained.

Comparative Example 4

10 parts of component C2 and 90 parts of component P1 are homogenized together on a twin-screw extruder (temperature of the extruder: 240 to 260° C.). A masterbatch MB4 is obtained.

Comparative Example 5

18 parts of component A, 4.5 parts of component B and 77.5 parts of component P1 are homogenized together on a twin-screw extruder (temperature of the extruder: 240 to 260° C.). A masterbatch MB5 is obtained.

Example 23

10 parts of component A, 2.5 parts of component B, 10 parts of component C1 and 77.5 parts of component P1 are homogenized together on a twin-screw extruder (temperature of the extruder: 240 to 260° C.). A masterbatch MB23 is obtained.

Example 24

10 parts of component A, 2.5 parts of component B, 10 parts of component C2 and 77.5 parts of component P1 are homogenized together on a twin-screw extruder (temperature of the extruder: 240 to 260° C.). A masterbatch MB24 is obtained.

Comparison Example 25

12.5 parts of component B, 10 parts of component C1 and 77.5 parts of component P1 are homogenized together on a twin-screw extruder (temperature of the extruder: 240 to 260° C.). A masterbatch MB25 is obtained.

Comparison Example 28

8 parts of component B, 4 parts of component C1 and 88 parts of component P1 are homogenized together on a twin-screw extruder (temperature of the extruder: 240 to 260° C.). A masterbatch MB28 is obtained.

Comparison Example 29

8 parts of component B, 4 parts of component C2 and 88 parts of component P1 are homogenized together on a twin-screw extruder (temperature of the extruder: 240 to 260° C.). A masterbatch MB29 is obtained.

Example 30

10 parts of component A, 2.5 parts of component B, 10 parts of component C3 and 77.5 parts of component P1 are homogenized together on a twin-screw extruder (temperature of the extruder: 240 to 260° C.). A masterbatch MB30 is obtained.

Example 31

10 parts of component A, 2.5 parts of component B, 10 parts of component C4 and 77.5 parts of component P1 are homogenized together on a twin-screw extruder (temperature of the extruder: 240 to 260° C.). A masterbatch MB31 is obtained.

Comparison Example 32

11.2 parts of component A, 11.3 parts of component C1 and 77.5 parts of component P1 are homogenized together on a twin-screw extruder (temperature of the extruder: 240 to 260° C.). A masterbatch MB32 is obtained.

Comparison Example 33

11.2 parts of component A, 11.3 parts of component C2 and 77.5 parts of component P1 are homogenized together on a twin-screw extruder (temperature of the extruder: 240 to 260° C.). A masterbatch MB33 is obtained.

Example 34

10 parts of component A, 2.5 parts of component B, 10 parts of component C1 and 77.5 parts of component P2 are homogenized together on a twin-screw extruder (temperature of the extruder: 240 to 260° C.). A masterbatch MB34 is obtained.

TABLE A

| Example | Masterbatch Designation | A | B | C1 | C2 | C3 | C4 | P | Additive sum [% by weight] |
|---|---|---|---|---|---|---|---|---|---|
| Comp. 1 | MB1 | 10 | 0 | 0 | 0 | 0 | 0 | 90 | 10 |
| Comp. 2 | MB2 | 0 | 10 | 0 | 0 | 0 | 0 | 90 | 10 |
| Comp. 3 | MB3 | 0 | 0 | 10 | 0 | 0 | 0 | 90 | 10 |
| Comp. 4 | MB4 | 0 | 0 | 0 | 10 | 0 | 0 | 90 | 10 |
| Comp. 5 | MB5 | 18 | 4.5 | 0 | 0 | 0 | 0 | 77.5 | 22.5 |
| 23 | MB23 | 10 | 2.5 | 10 | 0 | 0 | 0 | 77.5 | 22.5 |
| 24 | MB24 | 10 | 2.5 | 0 | 10 | 0 | 0 | 77.5 | 22.5 |
| Comp. 25 | MB25 | 0 | 12.5 | 10 | 0 | 0 | 0 | 77.5 | 22.5 |
| Comp. 28 | MB28 | 0 | 8 | 4 | 0 | 0 | 0 | 88 | 12 |
| Comp. 29 | MB29 | 0 | 8 | 0 | 4 | 0 | 0 | 88 | 12 |
| 30 | MB30 | 10 | 2.5 | 0 | 0 | 10 | 0 | 77.5 | 22.5 |
| 31 | MB31 | 10 | 2.5 | 0 | 0 | 0 | 10 | 77.5 | 22.5 |
| Comp. 32 | MB32 | 11.2 | 0 | 11.3 | 0 | 0 | 0 | 77.5 | 22.5 |
| Comp. 33 | MB33 | 11.2 | 0 | 0 | 11.3 | 0 | 0 | 77.5 | 22.5 |
| 34 | MB34 | 10 | 2.5 | 10 | 0 | 0 | 0 | 77.5 | 22.5 |

Comparison Example 51

2.25 parts of a masterbatch MB1 produced as described in Comparison Example 1 were homogenized and mixed with 97.75 parts of component P1 on a flat film extruder (Collin). With a rotational speed of 100 rpm and a temperature of 260-270° C. a flat film FF51 with a thickness of 200 μm was obtained.

Comparison Example 52

2.25 parts of a masterbatch MB2 produced as described in Comparison Example 2 were homogenized and mixed with 97.75 parts of component P1 on a flat film extruder (Collin). With a rotational speed of 100 rpm and a temperature of 260-270° C. a flat film FF52 with a thickness of 200 μm was obtained.

Comparison Example 53

2.25 parts of a masterbatch MB3 produced as described in Comparison Example 3 were homogenized and mixed with 97.75 parts of component P1 on a flat film extruder (Collin). With a rotational speed of 100 rpm and a temperature of 260-270° C. a flat film FF53 with a thickness of 200 μm was obtained.

Comparison Example 54

2.25 parts of a masterbatch MB4 produced as described in Comparison Example 4 were homogenized and mixed with 97.75 parts of component P1 on a flat film extruder (Collin). With a rotational speed of 100 rpm and a temperature of 260-270° C. a flat film FF54 with a thickness of 200 μm was obtained.

Comparison Example 55

1.0 parts of a masterbatch MB5 produced as described in Comparison Example 5 were homogenized and mixed with 99 parts of component P1 on a flat film extruder (Collin). With a rotational speed of 100 rpm and a temperature of 260-270° C. a flat film FF55 with a thickness of 200 μm was obtained.

Example 56

1.0 parts of a masterbatch MB23 produced as described in Example 23 were homogenized and mixed with 99 parts of component P1 on a flat film extruder (Collin). With a rotational speed of 100 rpm and a temperature of 260-270° C. a flat film FF56 with a thickness of 200 μm was obtained.

Example 57

1.0 parts of a masterbatch MB24 produced as described in Example 24 were homogenized and mixed with 99 parts of component P1 on a flat film extruder (Collin). With a rotational speed of 100 rpm and a temperature of 260-270° C. a flat film FF57 with a thickness of 200 μm was obtained.

Comparison Example 58

1.0 parts of a masterbatch MB25 produced as described in Comparison Example 25 were homogenized and mixed with 99 parts of component P1 on a flat film extruder (Collin). With a rotational speed of 100 rpm and a temperature of 260-270° C. a flat film FF58 with a thickness of 200 μm was obtained.

Comparison Example 60

5 parts of a masterbatch MB28 produced as described in Comparison Example 28 were homogenized and mixed with 95 parts of component P1 on a flat film extruder (Collin). With a rotational speed of 100 rpm and a temperature of 260-270° C. a flat film FF60 with a thickness of 200 μm was obtained.

Comparison Example 61

5 parts of a masterbatch MB29 produced as described in Comparison Example 29 were homogenized and mixed with 95 parts of component P1 on a flat film extruder (Collin). With a rotational speed of 100 rpm and a temperature of 260-270° C. a flat film FF61 with a thickness of 200 μm was obtained.

Example 62

1.0 parts of a masterbatch MB30 produced as described in Example 30 were homogenized and mixed with 99 parts of component P1 on a flat film extruder (Collin). With a rotational speed of 100 rpm and a temperature of 260-270° C. a flat film FF62 with a thickness of 200 μm was obtained.

Example 63

1.0 parts of a masterbatch MB31 produced as described in Example 31 were homogenized and mixed with 99 parts of component P1 on a flat film extruder (Collin). With a rotational speed of 100 rpm and a temperature of 260-270° C. a flat film FF63 with a thickness of 200 μm was obtained.

Comparison Example 64

1.0 parts of a masterbatch MB32 produced as described in Comparison Example 32 were homogenized and mixed with 99 parts of component P1 on a flat film extruder (Collin). With a rotational speed of 100 rpm and a temperature of 260-270° C. a flat film FF64 with a thickness of 200 μm was obtained.

Comparison Example 65

1.0 parts of a masterbatch MB33 produced as described in Comparison Example 33 were homogenized and mixed with 99 parts of component P1 on a flat film extruder (Collin). With a rotational speed of 100 rpm and a temperature of 260-270° C. a flat film FF65 with a thickness of 200 μm was obtained.

Example 66

1.0 parts of a masterbatch MB34 produced as described in Example 34 were homogenized and mixed with 99 parts of component P2 on a flat film extruder (Collin). With a rotational speed of 100 rpm and a temperature of 260-270° C. a flat film FF66 with a thickness of 200 μm was obtained.

| Example | Flat Film Designation | Additive loading [% by weight] | Surface resistance [ohm] | ChargeDecay Time [s] | Haze Value [%] |
|---|---|---|---|---|---|
| Comp. 51 | FF51 | 0.225 | $>10^{13}$ | >200 | 11.3 |
| Comp. 52 | FF52 | 0.225 | $>10^{13}$ | >200 | 0.7 |
| Comp. 53 | FF53 | 0.225 | $>10^{13}$ | >200 | 1.0 |
| Comp. 54 | FF54 | 0.225 | $>10^{13}$ | >200 | 0.7 |
| Comp. 55 | FF55 | 0.225 | $>10^{13}$ | >200 | 20.0 |
| 56 | FF56 | 0.225 | $10^{12}$ | 33 | 4.5 |
| 57 | FF57 | 0.225 | $10^{12}$ | 112 | 3.0 |
| Comp. 58 | FF58 | 0.225 | $10^{12}$ | >200 | 2.6 |
| Comp. 60 | FF60 | 0.6 | $3*10^{12}$ | >200 | 5.7 |
| Comp. 61 | FF61 | 0.6 | $>10^{13}$ | >200 | 1.1 |
| 62 | FF62 | 0.225 | $10^{12}$ | 16 | 4.1 |
| 63 | FF63 | 0.225 | $10^{12}$ | 43 | 2.4 |
| Comp. 64 | FF64 | 0.225 | $2*10^{12}$ | >200 | 3.7 |
| Comp. 65 | FF65 | 0.225 | $1.5*10^{12}$ | >200 | 1.8 |
| 66 | FF66 | 0.225 | $1*10^{12}$ | 150 | 5.0 |

The invention claimed is:

1. A composition Z comprising a component A, a component B, a component C and a component P, wherein
   the component A is an alkyl sulfonate, alkylbenzene sulfonate, olefin sulfonate or a mixture thereof,
   the component B is a fatty acid monoglyceride,
   the component C is a polyethylene glycol,
   and the component P is a thermoplastic polyester.

2. The composition Z as claimed in claim 1, wherein component A is an alkali metal $C_6$-$C_{22}$-alkyl sulfonate.

3. The composition Z as claimed in claim 1, wherein the fatty acid of the fatty acid monoglyceride has a chain length of from $C_4$ to $C_{24}$.

4. The composition Z as claimed in claim 1, wherein the thermoplastic polyester P contains a diol component which is selected from the group consisting of ethylene glycol, diethylene glycol, butane-1,4-diol, cyclohexylene-1,4-diol, 1,4-cyclohexylenedimethanol, and 2,2,4,4-tetramethylcyclobutane-1,3-diol.

5. The composition Z as claimed in claim 1, wherein the thermoplastic polyester P contains a dicarboxylic acid component selected from the group consisting of terephthalic acid, dimethylterephthalic acid, phthalic acid, isophthalic acid, and naphthalene-2,6-dicarboxylic acid.

6. The composition Z as claimed in claim 1, wherein the thermoplastic polyester P is a homopolymer selected from the group consisting of polybutylene terephthalate, polyethylene terephthalate, polyethylene 2,6 naphthalate, poly trimethylene terepthalate, and poly (1,4-cyclohexylendimethyl terephtalate).

7. The composition Z as claimed in claim 1, wherein the thermoplastic polyester P is a copolymer of diethyleneglycol-modified or cyclohexan-1,4-dimethanol-modified polyethylene terephthalate, or from an isophthalic acid-modified polyethylene terephthalate.

8. The composition as claimed in claim 1, wherein the thermoplastic polyester P is a copolymer of thermoplastic polyesters made from dimethyl terephthalate, 1,4-cyclohexane-1,4-dimethanol or 2,2,4,4-tetramethylcyclobutane-1,3-diol.

9. The composition Z as claimed in claim 1, comprising
0.05 to 30% by weight of the component A,
0.01 to 12.5% by weight of the component B,
0.05 to 30% by weight of the component C,
27.5 to 99.89% by weight of the component P,
with the weight % being based on the total weight of composition Z.

10. The composition Z as claimed in claim 1, wherein the composition Z is in the form of a masterbatch comprising
4.1 to 30% by weight of the component A,
1 to 12.5% by weight of the component B;
5 to 30% by weight of the component C;
27.5 to 89.9% by weight of the component P;
with the weight % being based on the total weight of composition Z.

11. A process for producing a composition Z comprising a component A, a component B, a component C and a component P, wherein
the component A is an alkyl sulfonate, alkylbenzene sulfonate, olefin sulfonate or a mixture thereof,
the component B is a fatty acid monoglyceride,
the component C is a polyethylene glycol,
and the component P is a thermoplastic polyester,
comprising the step of physically mixing the components A, B, C and P.

12. The process as claimed in claim 11, wherein the mixing is performed with an apparatus selected from the group consisting of extruders, kneaders, presses, injection-moulding machines and blade mixers.

13. An antistatic thermoplastic polyester article a composition Z, wherein the composition Z comprises a component A, a component B, a component C and a component P, wherein
the component A is an alkyl sulfonate, alkylbenzene sulfonate, olefin sulfonate or a mixture thereof,
the component B is a fatty acid monoglyceride,
the component C is a polyethylene glycol,
and the component P is a thermoplastic polyester.

14. An antistatic thermoplastic single or multilayer polyester film, sheet or board comprising a composition Z, wherein the composition Z comprises a component A, a component B, a component C and a component P, wherein
the component A is an alkyl sulfonate, alkylbenzene sulfonate, olefin sulfonate or a mixture thereof,
the component B is a fatty acid monoglyceride,
the component C is a polyethylene glycol,
and the component P is a thermoplastic polyester.

15. An antistatic package or article made to avoid explosion hazards comprising a composition Z, wherein the composition Z comprises a component A, a component B, a component C and a component P, wherein
the component A is an alkyl sulfonate, alkylbenzene sulfonate, olefin sulfonate or a mixture thereof,
the component B is a fatty acid monoglyceride,
the component C is a polyethylene glycol,
and the component P is a thermoplastic polyester.

* * * * *